US008160101B2

(12) United States Patent
Kwak et al.

(10) Patent No.: US 8,160,101 B2
(45) Date of Patent: Apr. 17, 2012

(54) METHOD FOR COMMUNICATING DATA BETWEEN MOBILE STATION AND BASE STATION, AND MOBILE COMMUNICATION TERMINAL THEREOF

(75) Inventors: Jin Sam Kwak, Gyeonggi-do (KR); Ki Seon Ryu, Gyeonggi-do (KR); Bin Chul Ihm, Gyeonggi-do (KR); Yeong Hyeon Kwon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 12/682,875

(22) PCT Filed: Oct. 1, 2008

(86) PCT No.: PCT/KR2008/005779
§ 371 (c)(1),
(2), (4) Date: Apr. 22, 2010

(87) PCT Pub. No.: WO2009/051358
PCT Pub. Date: Apr. 23, 2009

(65) Prior Publication Data
US 2010/0226290 A1    Sep. 9, 2010

Related U.S. Application Data

(60) Provisional application No. 60/979,871, filed on Oct. 15, 2007.

(30) Foreign Application Priority Data

Dec. 18, 2007    (KR) ........................ 10-2007-0133494

(51) Int. Cl.
*H04J 3/16*    (2006.01)

(52) U.S. Cl. ........................................ 370/471; 370/473
(58) Field of Classification Search .................. 370/278, 370/281, 282, 295, 319, 344, 377, 384, 471, 370/473
See application file for complete search history.

(56) References Cited

U.S. PATENT DOCUMENTS

| 7,197,022 B2 | 3/2007 | Stanwood et al. | |
| 7,339,926 B2* | 3/2008 | Stanwood et al. | 370/375 |
| 7,986,662 B2* | 7/2011 | Jang et al. | 370/329 |
| 2011/0134747 A1* | 6/2011 | Kwon et al. | 370/208 |

OTHER PUBLICATIONS

Liu et al., "User Partitioning Based Resource Assignment in Half-Duplex FDD Relaying Cellular Networks" Vehicular Technology Conference, 2007, VTC2007 Spring IEEE 65th, Apr. 22-24, 2007, pp. 985-989.

* cited by examiner

*Primary Examiner* — Brenda H Pham
(74) *Attorney, Agent, or Firm* — Birch, Stewart, Kolasch & Birch, LLP (57) ABSTRACT

A method for transmitting and receiving data by a mobile station (MS), a method for transmitting and receiving data by a base station (BS), and a mobile communication terminal are provided. The method for transmitting and receiving data by an MS includes generating an uplink subframe by placing an uplink control channel so as to have a margin with a time allocated to a MAP of a downlink subframe and transmitting the uplink subframe to a BS. A new frame structure compatible with a full duplex FDD MS is applied in a mobile communication system.

14 Claims, 7 Drawing Sheets

METHOD FOR COMMUNICATING DATA BETWEEN MOBILE STATION AND BASE STATION, AND MOBILE COMMUNICATION TERMINAL THEREOF

CROSS REFERENCE TO RELATED APPLICATIONS

This application is the National Phase of PCT/KR2008/005779 filed on Oct. 1, 2008, which claims priority under 35 U.S.C. 119(e) to U.S. Provisional Application No. 60/979,871 filed on Oct. 15, 2007 and under 35 U.S.C. 119(a) to patent application Ser. No. 10-2007-0133494 filed in the Republic of Korea, on Dec. 18, 2007, all of which are hereby expressly incorporated by reference into the present application.

TECHNICAL FIELD

The present invention relates to a method for supporting a half duplex Frequency Division Duplex (FDD) terminal or Mobile Station (MS), and more particularly, to a method allowing a half duplex FDD MS operated by a full duplex FDD base station to coexist with a full duplex FDD MS while maximizing efficiency of wireless resources and a mobile communication terminal for the same.

BACKGROUND ART

World Interoperability for Microwave Access (WiMAX) is based on the IEEE 802.16 standard. Unlike IEEE 802.11a wireless LAN, the spread of which was delayed due to the problem of compatibility between equipment in different regions, the IEEE 802.16 standard was initially designed in consideration of compatibility with the European ETSI standard and thus has been recognized as a worldwide wireless MAN standard.

The IEEE 802.16 standard is divided into IEEE 802.16 in which Line-of-Sight (LOS) should be secured, IEEE 802.16a which uses low frequencies of 11 Ghz or less, and IEEE 802.16e to which restricted mobility and roaming functions have been added.

A full-duplex communication scheme is a scheme in which data can be simultaneously transmitted in both the uplink and downlink directions. A half-duplex communication scheme is a scheme in which data cannot be simultaneously transmitted in both the uplink and downlink directions although data can be transmitted in both the directions. That is, a half duplex terminal or Mobile Station (MS) performs only one of an operation for transmitting data or an operation for receiving data.

When the WiMAX system supports operation of a Frequency Division Duplex (FDD) MS within a Time Division Duplex (TDD) frame length of 5 ms, the length of each subframe has a length of equal to or less than 5 ms (for example, 5 ms, 2.5 ms, or 1.25 ms) and a preamble can be transmitted at intervals of 5 ms or less. Scheduling methods that can be used in this case include a method that takes into consideration a frame structure for each MS based on scheduling of the base station and a method which groups half duplex FDD MSs to create a frame based on the group.

Figure 1:
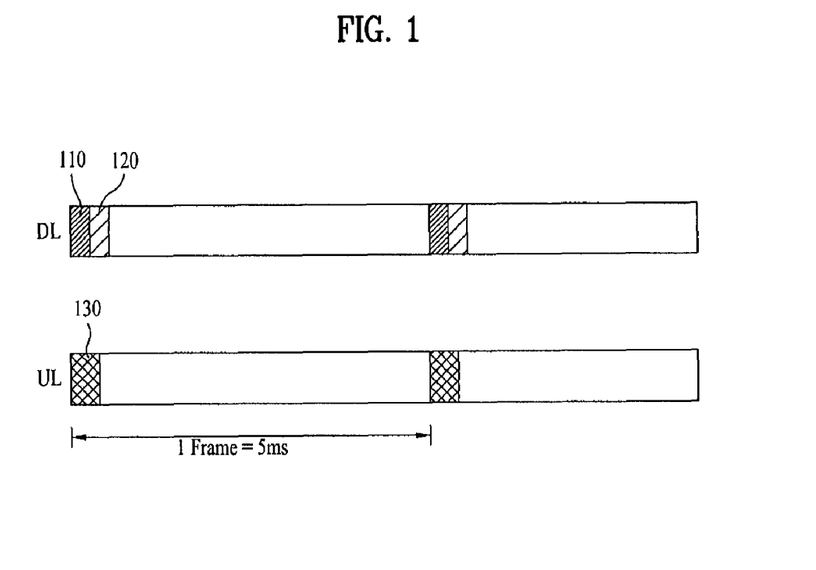
FIG. 1 illustrates an example of a conventional full duplex FDD frame structure.

FIG. 1 illustrates an example of a conventional full duplex FDD frame structure.

The frame structure of FIG. 1 causes no problem in the case of full duplex FDD operation. However, a downlink preamble 110 and a downlink MAP 120 collide with an uplink control region 130 in the case of half duplex FDD operation.

One method used to avoid such collision during half duplex FDD operation is to assign a DL/UL offset between a downlink frame and an uplink frame using an allocation start time or to group a downlink frame and an uplink frame.

However, even when this collision avoidance method is applied, it is not possible to reduce a transition time gap in the conventional frame structure or to prevent collision of a downlink preamble or control signal region with an uplink control channel and an excessive transition time occurs, hindering efficient utilization of resources during half duplex FDD operation.

DISCLOSURE

Technical Problem

A first object of the present invention devised to solve the problem lies in providing a method for transmitting and receiving data by a Mobile Station (MS), which can allow a half duplex FDD MS to coexist with a full duplex FDD MS and can reduce the transition time gap of the half duplex FDD MS or can prevent collision of a downlink preamble or control signal region with an uplink control channel, thereby maximizing efficiency of wireless resources.

A second object of the present invention devised to solve the problem lies in providing a method for transmitting and receiving data by a base station, which can prevent interference between a half duplex FDD MS and a full duplex FDD MS and can maximize efficiency of resources in transmission and reception data of the half duplex FDD MS.

A third object of the present invention devised to solve the problem lies in providing a mobile communication terminal to which the method for transmitting and receiving data by an MS is applied.

Technical Solution

In accordance with an embodiment of the present invention to achieve the first object, provided herein is a method for transmitting and receiving data by a mobile station (MS), the method including generating an uplink subframe by placing an uplink control channel so as to have a margin with a time allocated to a MAP of a downlink subframe, and transmitting the uplink subframe to a base station (BS).

The uplink control channel may include a control signal for data placed prior to the uplink control channel in the uplink subframe.

The uplink control channel may be placed according to information included in at least one of a UCD or a UL-MAP in the downlink subframe.

The step of generating the uplink subframe may include receiving at least one of a preamble or the MAP from the downlink subframe if there is no data to be transmitted in uplink.

In the step of transmitting the uplink subframe, the MS may transmit at least two consecutive uplink subframes to increase utilization of resources.

The step of transmitting the uplink subframe may include switching a transmission/reception mode according to scheduling information included in the downlink subframe if the MS is a half-duplex MS. Here, the scheduling information may be a zone switch information element (IE) defined to allocate uplink resources.

In accordance with an embodiment of the present invention to achieve the second object, provided herein is a method for a base station (BS) to transmit and receive data to and from a mobile station (MS), the method including receiving data from an uplink subframe, and receiving an uplink control channel placed so as to have a margin with a time allocated to a MAP of a downlink subframe from the uplink subframe.

The received uplink control channel may include a control signal for data received prior to the uplink control channel in the uplink subframe.

The method of this embodiment may further include generating the downlink subframe by placing a preamble at intervals of a period equal to a multiple of a length of the uplink subframe when there is no data to be transmitted in uplink, and transmitting the downlink subframe to the MS.

In the step of transmitting the downlink subframe, the BS may transmit at least two consecutive downlink subframes to increase utilization of resources.

The step of transmitting the downlink subframe may include inserting scheduling information into the downlink subframe. Here, the scheduling information may be a zone switch information element (IE) defined to switch a transmission/reception mode of a half-duplex MS.

In accordance with an embodiment of the present invention to achieve the third object, provided herein is a mobile station (MS) including a receiver to receive a downlink subframe from a base station (BS), a processor to generate an uplink subframe by placing an uplink control channel so as to have a margin with a time allocated to a MAP of the downlink subframe, and a transmitter to transmit the uplink subframe to the BS.

The uplink control channel may include a control signal for data placed prior to the uplink control channel in the uplink subframe.

The uplink control channel may be placed according to information included in at least one of a UCD or a UL-MAP in the downlink subframe.

The receiver may receive at least one of a preamble or a MAP from the downlink subframe if there is no data to be transmitted in uplink.

Advantageous Effects

According to the embodiments of the present invention, a new frame structure compatible with the full duplex FDD MS is applied in the mobile communication system to allow the half duplex FDD MS to coexist with the full duplex FDD MS and to reduce the transition time gap of the half duplex FDD MS or to prevent collision of a downlink preamble or control signal region with an uplink control channel, thereby maximizing efficiency of wireless resource allocation.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention with reference to the accompanying drawings. The embodiments of the present invention described below can be modified into various other forms. That is, the scope of the present invention is not limited to the following embodiments.

Figure 2:
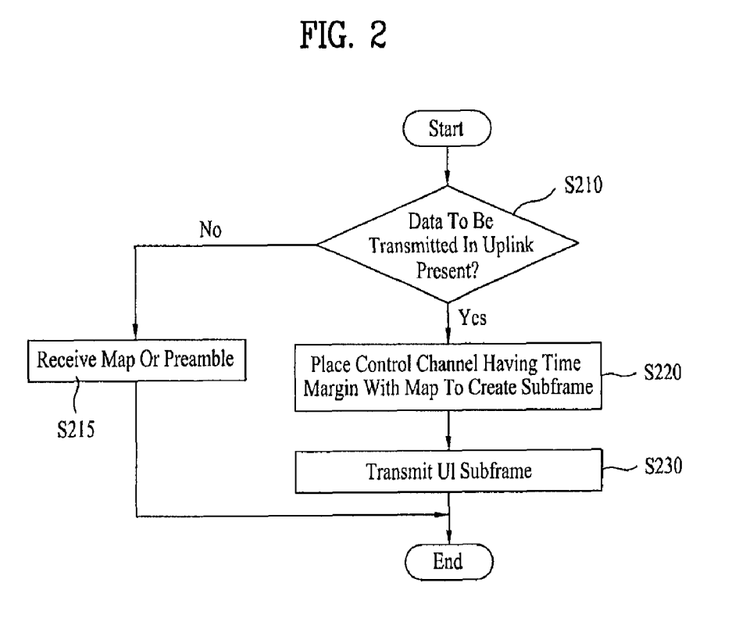
FIG. 2 is a flow chart of a method for transmitting and receiving data by a terminal or Mobile Station (MS) according to an embodiment of the present invention.

FIG. 2 is a flow chart of a method for transmitting and receiving data by a terminal or Mobile Station (MS) according to an embodiment of the present invention.

First, the MS which operates in FDD determines whether or not data to be transmitted in uplink is present (S210).

When data to be transmitted in uplink is present, the MS creates an uplink subframe by placing an uplink control channel therein so as to have a margin with a time allocated to a MAP of a downlink subframe (S220). Here, the margin is a time interval that satisfies a requirement that the MAP of the downlink subframe not overlap with a duration of the uplink control channel. For example, the uplink control channel may be located at an end of a frame or a subframe to avoid collision.

Preferably, the uplink control channel may be placed according to information included in a UCD, a UL-MAP, etc., of the downlink subframe. The uplink subframe includes data to be transmitted by the MS. The uplink control channel includes a control signal for data placed prior to the uplink control channel in the uplink subframe.

The MS then transmits the created uplink subframe to a Base Station (BS) (S230) and terminates the procedure. Here, the MS can consecutively transmit at least two uplink subframes to the BS.

On the other hand, when data to be transmitted in uplink is absent, the MS receives at least one of a preamble or a MAP of the downlink subframe (S215) and terminates the procedure.

A method for a base station to transmit and receive data to and from an MS operating in FDD according to an embodiment of the present invention includes the following processes.

First, the base station receives data of an uplink subframe. Here, when uplink transmission is absent, the base station can perform scheduling so as to consecutively transmit at least two downlink subframes to the MS. In this process, the base station can insert scheduling information into the downlink subframe. Preferably, the scheduling information may be a zone switch Information Element (IE) defined to switch the transmission/reception mode of the half duplex MS.

Then, the base station receives an uplink control channel placed so as to have a margin with a MAP of the downlink subframe in the uplink subframe. On the other hand, when uplink transmission is absent, the base station can perform scheduling so as to consecutively transmit at least two downlink subframes to the MS.

If the MS consecutively transmits at least two uplink subframes to the base station and the base station consecutively transmits at least two downlink subframes to the MS, it is possible to reduce the transition time gap of the MS and to increase resource efficiency.

Figure 3:
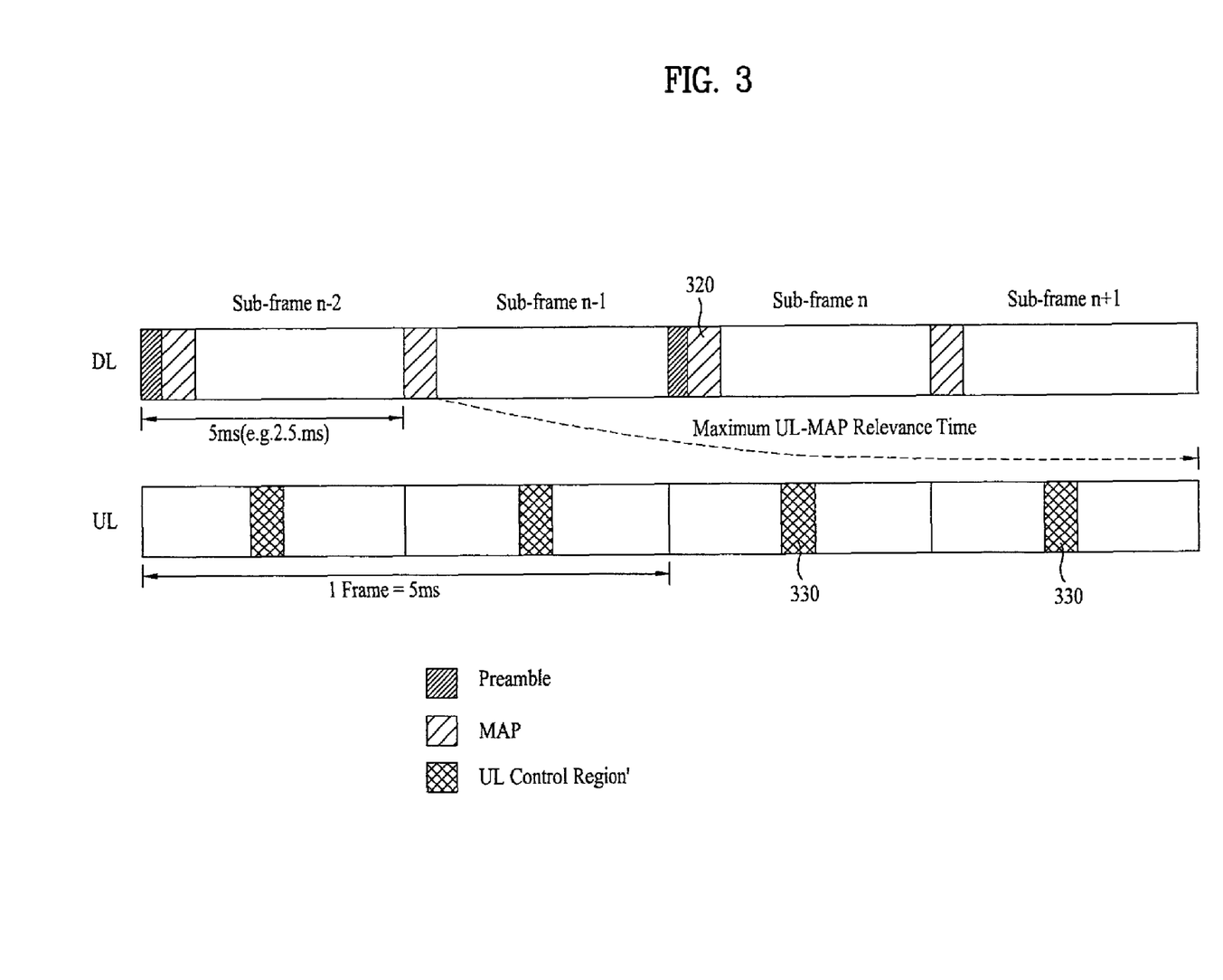
FIG. 3 illustrates an example of an FDD frame structure according to an embodiment of the present invention.

FIG. 3 illustrates an example of an FDD frame structure according to an embodiment of the present invention.

The embodiment of FIG. 3 suggests a frame structure that supports a half duplex FDD MS without reducing unique performance of the existing full duplex FDD MS when the half duplex FDD MS coexists with the full duplex FDD MS.

In this example, it is required that a basic transmission time unit (TTI) for full duplex FDD transmission be shorter than the length of one frame "5 ms" as shown in FIG. 3. Unlike TDD, FDD employs a basic TTI to enable efficient processing of HARQ latency, CQI feedback, closed-loop MIMO, etc., which affect system performance. FIG. 3 illustrates an example wherein one subframe has a length of 2.5 ms and one frame includes two subframes. Simultaneous transmission of a MAP and a preamble in the case where the TDD-based WiMAX system is extended to FDD may increase actual overhead. Accordingly, in the case where one frame having a length of 5 ms includes a plurality of divided subframes, it is preferable that a preamble be transmitted at intervals of 5 ms or a multiple of 5 ms.

Here, in the case where an uplink control channel is set in the same time interval as the region of a control signal or a preamble that is transmitted in downlink, the MS cannot simultaneously perform transmission and reception due to the characteristics of half duplex. To overcome this problem, a UCD or UL-MAP IE defined in the current IEEE 802.16e can be utilized so that the two regions do not overlap to avoid collision of DL/UL control channels. In the example of FIG. 3, a UL control channel 330 is located at the center of a UL subframe to secure a time margin with the DL preamble and MAP.

Here, to receive the DL/UL MAP, the half duplex FDD MS is set to always receive the preamble or MAP in the case where uplink transmission is absent. For example, the MS receives a DL MAP 320 when uplink transmission is absent in a subframe n.

The following are additional considerations that can be taken into account from the viewpoint of half duplex FDD.

In the basic frame structure of FIG. 3, DL subframe resource allocation information set by a DL MAP represents a resource region using the current preamble as a start (or reference) point of the region. In the case where the preamble is set as the reference time point in this manner, a reference (start) point used in subframe resource region information allocated by each DL MAP inserted in a frame may be a preamble of a previous frame. Resource allocation information of a relatively large length is required in this case. To reduce the length of the resource allocation information, it is preferable that the reference time point of the resource allocation information for a symbol offset set by a MAP of the corresponding frame or subframe be changed to other values as follows.

For example, the reference time point may be set to the start or end position of a preamble or a MAP of a previous frame or a previous subframe. Alternatively, the reference time point may be set to the start or end position of a preamble or a MAP of one of a previous frame or a previous subframe closer to the MAP of the current subframe.

On the other hand, the reference time point may be set to a position within a next frame or a next subframe. Specifically, the reference time point may be set to the start or end position of a preamble or a MAP of a next frame or a next subframe. Alternatively, the reference time point may be set to the start or end position of a preamble or a MAP of a closest one of a next frame or a next subframe.

Alternatively, a reference time point for a MAP that is not consecutively transmitted with any preamble may be set to the start or end position of the MAP. This may be considered a method of setting of the start (or reference) position to the start or end of the corresponding subframe or to the start or end of a previous subframe according to a preset subframe configuration scheme.

On the other hand, when one frame has a length of 5 ms or another specific length, an FDD frame or subframe includes a fixed maximum number of OFDM symbols according to the frame length. Here, since the actual OFDM symbol length is not determined based on the total length of an integer number of OFDM symbols included in each frame, a surplus time interval is left in each frame. While this surplus time can be used as a TTG/RTG in the case of the TDD system, it can be used for a specific region for other purposes in the case of the FDD system.

For example, when 1024 FFT and a ⅛ Cyclic Prefix (CP) are used in a band of 10 MHz, a 5 ms frame includes 48 OFDM symbols and an idle time of 64.6 μs since the length of one OFDM symbol is about 102.8 μsec. In the case of FDD, when one frame includes two subframes, the idle time can be divided into equal parts and the parts of the idle time may be allocated between the subframes or the entirety of the idle time may be allocated to an end portion of the frame. Alternatively, different idle times can be allocated between subframes. A CP of a specific OFDM symbol may also be extended.

Figure 4:
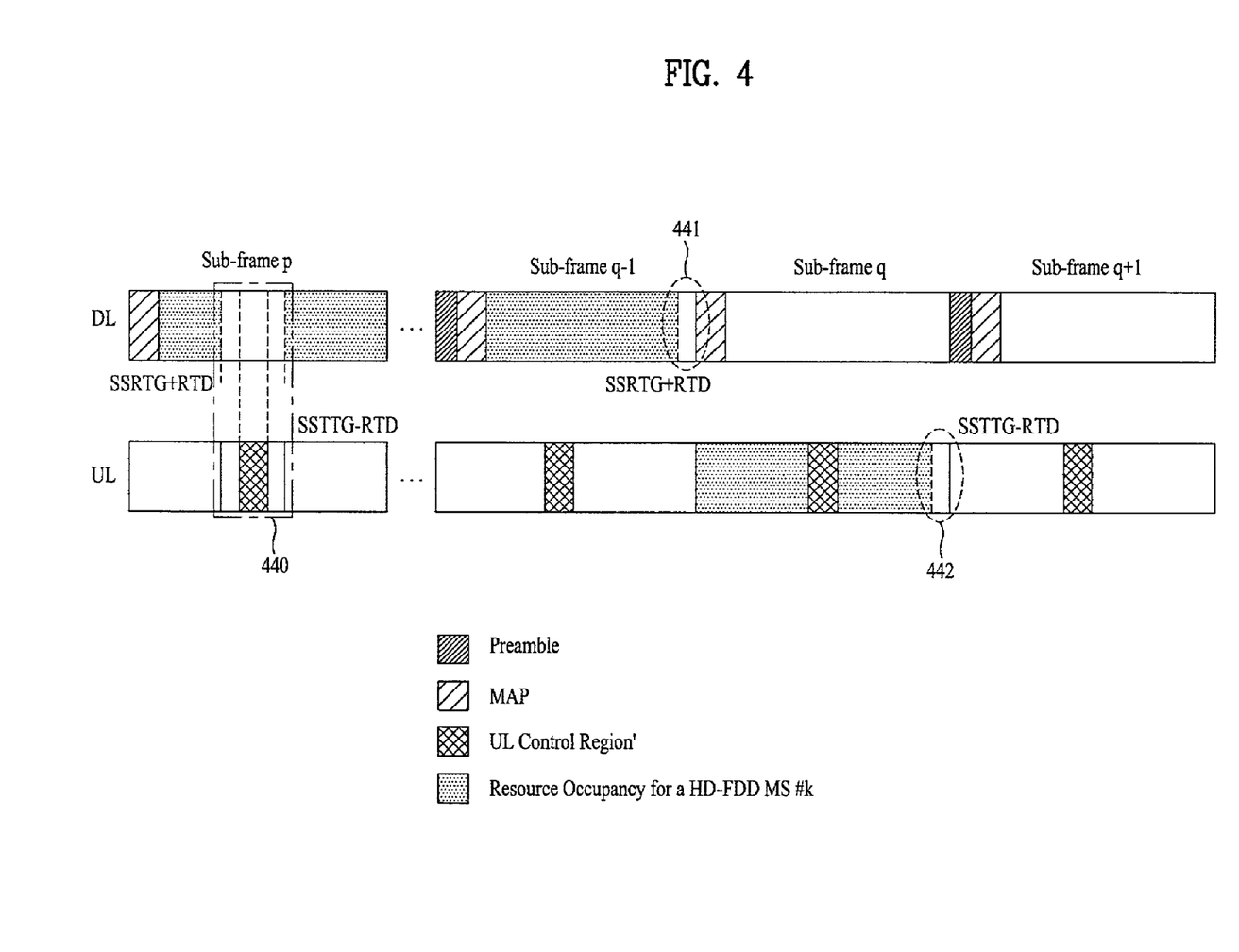
FIG. 4 illustrates an example time gap required during full duplex FDD operation with the structure of FIG. 3.

FIG. 4 illustrates an example time gap required during full duplex FDD operation with the structure of FIG. 3.

Figure 5:
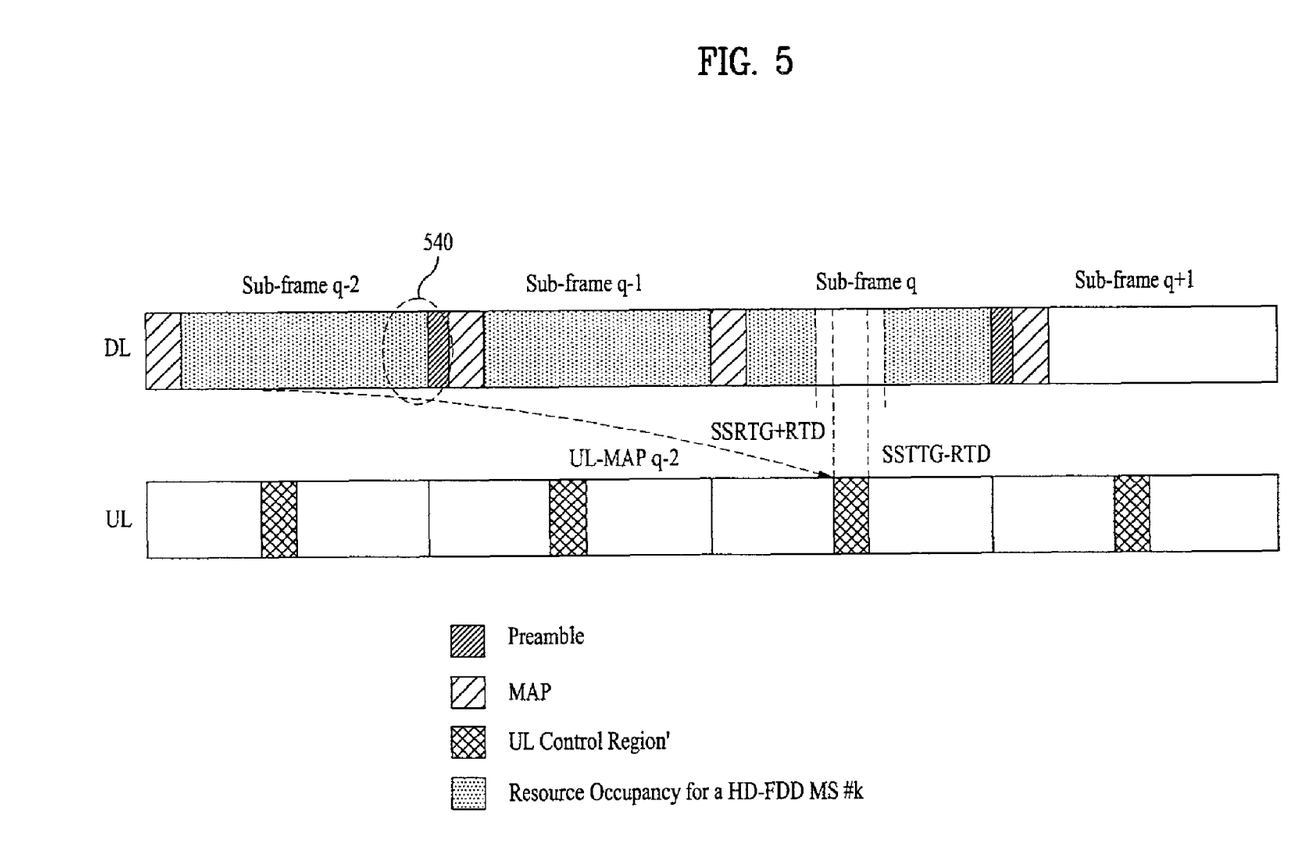
FIG. 5 illustrates an example time gap required when consecutive downlink subframe transmission is possible in the structure of FIG. 3.
Figure 6:
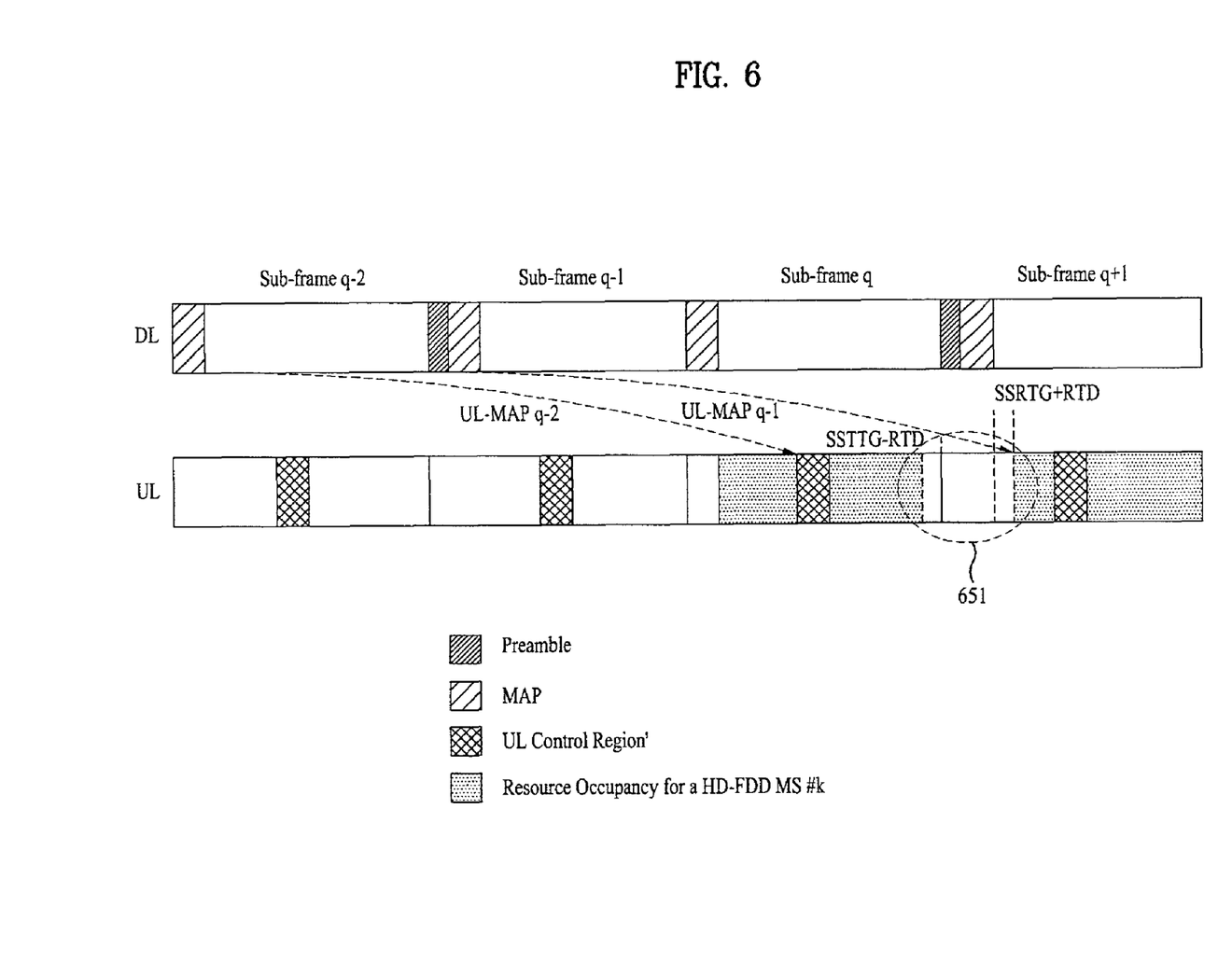
FIG. 6 illustrates an example time gap required to receive a preamble or MAP when uplink transmission is absent in the structure of FIG. 3.

In half duplex FDD, there is a need to take into consideration a transition time gap between downlink reception and uplink transmission. When DL reception is requested in a subframe carrying a UL control channel (440), a Receive Time Gap (RTG) and a Transmit Time Gap (TTG) are required. In the examples of FIGS. 4 to 6, SSRTG+RTD denotes an RTG of a BS and SSTTG+RTD denotes a TTG of an MS.

In the example of FIG. 4, no resources are allocated to the SSRTG+RTD 441 when the MS transits from DL transmission to UL transmission and to the SSTTG+RTD 442 when the MS transits from UL transmission to DL transmission.

It is required that the half duplex FDD MS perform an operation associated with the time gap during DL/UL or UL/DL transition. However, creating a frame so that the time gap is structurally fixed causes a problem in that an unnecessary time gap is set during an actual full duplex FDD MS operation or when the half duplex FDD MS transmits consecutive frames or subframes. Accordingly, the basic DL/UL frame or subframe length may be fixed and a specific time interval may be set as needed by the full duplex MS. The base station can support this feature through scheduling.

Particularly, if a zone switch IE defined in the current IEEE 802.16e is used to allocate UL resources, it is possible to perform different resource allocation on the half duplex FDD MS and the full duplex FDD MS.

FIG. 5 illustrates an example time gap required when consecutive downlink subframe transmission is possible in the structure of FIG. 3.

The example of FIG. 5 shows consecutive frames or subframes in DL transmission. When a UL MAP of a DL subframe "q−2" indicates transmission of an uplink control channel of a UL subframe "q", the MS can switch the transmission/reception mode to UL transmission while receiving the DL subframe "q". Here, the half duplex FDD MS does not need to switch the transmission/reception mode due to consecutive DL transmission. In addition, the BS can allocate resources to a subframe including the end portion thereof. Accordingly, it is possible increase utilization of DL resources when downlink subframe transmission is possible.

FIG. 6 illustrates an example time gap required to receive a preamble or MAP when uplink transmission is absent in the structure of FIG. 3.

In the case of UL transmission, it is also possible to reduce the time required to switch the transmission/reception mode and to increase utilization of actual resources through consecutive UL subframe transmission.

While uplink transmission is absent, the MS receives a UL MAP of a DL subframe "q−2" and a UL MAP of a DL subframe "q−1". When a UL MAP of the DL subframe "q−2" indicates uplink transmission of a UL subframe "q" and a UL MAP of the DL subframe "q−1" indicates uplink transmission of a UL subframe "q+1", the MS can consecutively transmit the UL subframe "q" and the UL subframe "q+1".

On the other hand, in the case where the preamble and MAP are set to be always detected by the half duplex FDD MS, resources cannot be freely allocated to a specific portion 651 of the frame structure. This may reduce efficiency of resources of the actual half duplex FDD MS. The same operation may be required in the full duplex FDD MS and thus allocation of an additional region may be required to distinguish between the full duplex FDD MS and the half duplex FDD MS.

Figure 7:
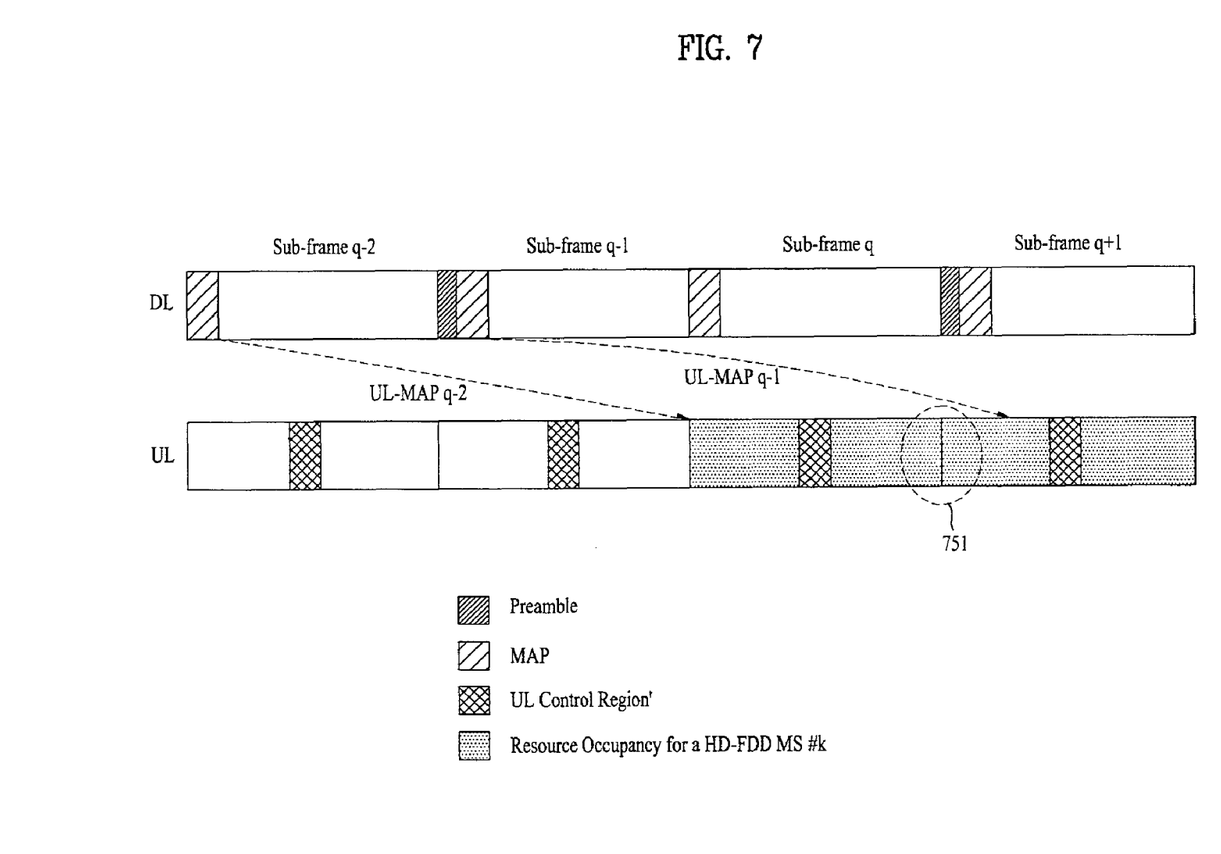
FIG. 7 illustrates an example time gap required when consecutive uplink subframe transmission is possible in the structure of FIG. 3.

FIG. 7 illustrates an example time gap required when consecutive uplink subframe transmission is possible in the structure of FIG. 3.

When a UL MAP of the DL subframe "q−2" indicates uplink transmission of a UL subframe "q" and a UL MAP of the DL subframe "q−1" indicates uplink transmission of a UL subframe "q+1", the MS can consecutively transmit the UL subframe "q" and the UL subframe "q+1". Here, if the MS does not receive a DL preamble or MAP while performing UL transmission, it is possible to minimize the need for RTG or TTG. That is, at time "751" between the UL subframe "q" and the UL subframe "q+1", the MS does not need to switch the transmission/reception mode. Thus, it is possible to maximize utilization of resources of the half duplex MS.

Figure 8:
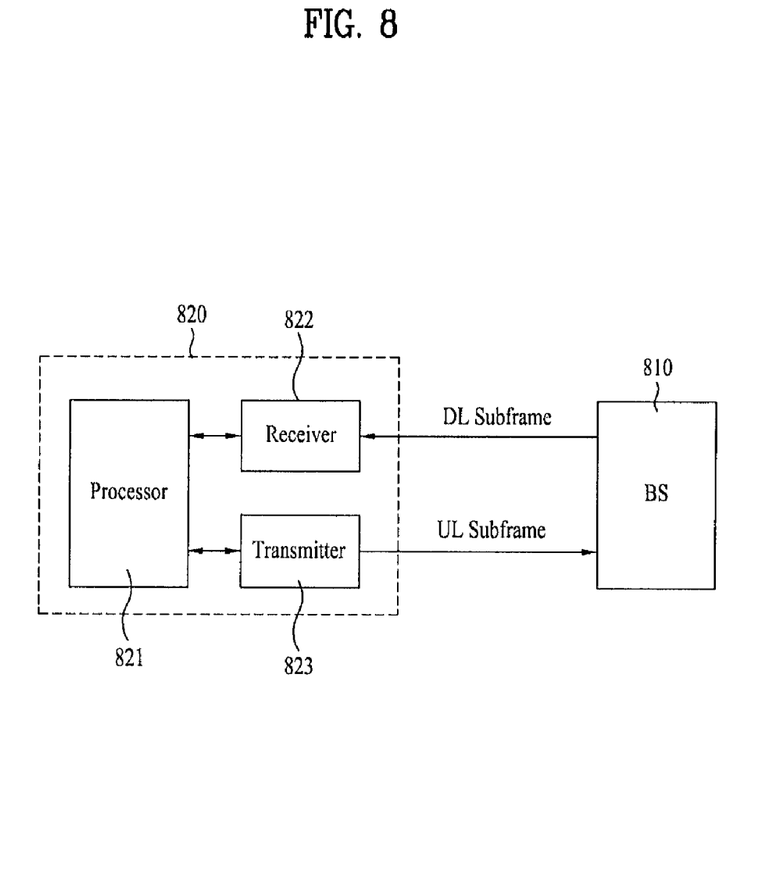
FIG. 8 is an exemplary block diagram of a mobile communication terminal or Mobile Station (MS) according to an embodiment of the present invention.

FIG. 8 is an exemplary block diagram of a mobile communication terminal or Mobile Station (MS) according to an embodiment of the present invention.

An MS 820 that operates in FDD includes a processor 821, a receiver 822, and a transmitter 823.

The receiver 822 receives a downlink subframe from a base station 810. Preferably, the receiver 822 can receive at least one of a preamble or MAP of a downlink subframe when data to be transmitted in uplink is absent.

The processor 821 creates an uplink subframe by placing an uplink control channel therein so as to have a margin with a time allocated to a MAP of a downlink subframe. Here, the uplink control channel may include a control signal for data placed prior to the uplink control channel in the uplink subframe. Preferably, the uplink control channel may be placed at a position according to information included in a UCD, a UL-MAP, etc., of the downlink subframe.

The transmitter 823 transmits an uplink subframe to the base station 810.

Although the present invention has been described with reference to the embodiments illustrated in the drawings, the embodiments are only illustrative and it will be apparent to those skilled in the art that various modifications and variations can be made from the embodiments. Such modifications and variations should be construed as being included in the scope of the invention. Thus, the scope of the invention should be determined based on the spirit of the appended claims.

[Industrial Applicability]

The present invention relates to Frequency Division Duplex (FDD) and more particularly to a frame structure and a scheduling method which can allow a half duplex FDD MS to coexist with a full duplex FDD MS and to reduce the transition time gap of the MS or to prevent collision of a downlink preamble or control signal region with an uplink control channel, thereby maximizing efficiency of wireless resource allocation and thus can be applied to relevant equipment such as a base station or a terminal of a mobile communication system operating in FDD or relevant algorithms.

The invention claimed is:

1. A method for transmitting and receiving data by a mobile station (MS) operating in Frequency Division Duplex (FDD), the method comprising:
   generating an uplink subframe by placing an uplink control channel so as to have a margin with a time allocated to a MAP of a downlink subframe; and
   transmitting the uplink subframe to a base station (BS), wherein the uplink control channel is placed according to information included in at least one of a UCD or a UL-MAP in the downlink subframe.

2. The method of claim 1, wherein the uplink control channel includes a control signal for data placed prior to the uplink control channel in the uplink subframe.

3. The method of claim 1, wherein the step of generating the uplink subframe comprises receiving at least one of a preamble or the MAP from the downlink subframe if there is no data to be transmitted in uplink.

4. The method of claim 1, wherein the step of transmitting the uplink subframe comprises transmitting at least two consecutive uplink subframes.

5. The method of claim 1, wherein the step of transmitting the uplink subframe comprises switching a transmission/reception mode according to scheduling information included in the downlink subframe if the MS is a half-duplex MS.

6. The method of claim 5, wherein the scheduling information is a zone switch information element (IE) defined to allocate uplink resources.

7. A method for a base station (BS) to transmit and receive data to and from a mobile station (MS) operating in Frequency Division Duplex (FDD), the method comprising:
   receiving data from an uplink subframe; and
   receiving an uplink control channel placed so as to have a margin with a time allocated to a MAP of a downlink subframe from the uplink subframe, wherein the uplink control channel is placed according to information included in at least one of a UCD or a UL-MAP in the downlink subframe.

8. The method of claim 7, wherein the received uplink control channel includes a control signal for data received prior to the uplink control channel in the uplink subframe.

9. The method of claim 7, further comprising generating the downlink subframe by placing a preamble at intervals of a period equal to a multiple of a length of the uplink subframe when there is no data to be transmitted in uplink; and
   transmitting the downlink subframe to the MS.

10. The method of claim 9, wherein the step of transmitting the downlink subframe comprises transmitting at least two consecutive downlink subframes.

11. The method of claim 9, wherein the step of transmitting the downlink subframe comprises inserting scheduling information into the downlink subframe.

12. The method of claim 11, wherein the scheduling information is a zone switch information element (IE) defined to switch a transmission/reception mode of a half-duplex MS.

13. A mobile station (MS) operating in Frequency Division Duplex (FDD), the MS comprising:
- a receiver to receive a downlink subframe from a base station (BS);
- a processor to generate an uplink subframe by placing an uplink control channel so as to have a margin with a time allocated to a MAP of the downlink subframe; and
- a transmitter to transmit the uplink subframe to the BS, wherein the uplink control channel is placed according to information included in at least one of a UCD or a UL-MAP in the downlink subframe.

14. The MS of claim 13, wherein the receiver receives at least one of a preamble or a MAP from the downlink subframe if there is no data to be transmitted in uplink.

* * * * *